United States Patent

[11] 3,631,719

| [72] | Inventors | Henri Charvier;<br>Jean-Louis Vernet, both of Blvd. Murat (16°), Paris, France |
|---|---|---|
| [21] | Appl. No. | 844,953 |
| [22] | Filed | July 25, 1969 |
| [45] | Patented | Jan. 4, 1972 |
| [32] | Priority | Sept. 13, 1963 |
| [33] | | France |
| [31] | | 947431 |
| | | Continuation-in-part of application Ser. No. 398,826, Sept. 11, 1964, now abandoned. This application July 25, 1969, Ser. No. 844,953 |

[54] FLUID SPEED MEASURING SYSTEM
2 Claims, 2 Drawing Figs.

| [52] | U.S. Cl. | 73/194 |
|---|---|---|
| [51] | Int. Cl. | G01p 5/00 |
| [50] | Field of Search | 73/194 |

[56] References Cited
UNITED STATES PATENTS

| 2,669,121 | 2/1954 | Garman et al. | 73/194 |
|---|---|---|---|
| 2,770,795 | 11/1956 | Peterson | 73/194 UX |
| 2,993,373 | 7/1961 | Kritz | 73/194 |
| 3,050,997 | 8/1962 | Lake | 73/194 |

*Primary Examiner*—Charles A. Ruehl
*Attorney*—Cushman, Darby & Cushman

ABSTRACT: The present invention relates to fluid speed discharge measuring devices comprising an oblique path terminated by two transducers and along which ultrasonic waves are propagated in opposite directions. The velocity of the fluid is determined as a function of the repetition frequencies of wave packets circulating from one transducer to the other and vice versa and also by taking into account the differential time delay obtained from phase shift measurement made at the carrier frequency of the wave packets.

FLUID SPEED MEASURING SYSTEM

This application is a continuation-in-part of the copending patent application Ser. No. 398,826 for "Fluid Speed Measuring System" filed Sept. 11, 1964, now abandoned. The present invention relates to fluid discharge speed measuring.

It in often necessary, for example in factories, and refineries, to measure the rate of flow of fluids in pipes. For this purpose, systems have been devised which measure the time of propagation of ultrasonic vibrations in the fluid.

In general, such system have the drawback either of lacking accuracy or of giving a measurement depending on the velocity of propagation of sound in the fluid, which is liable to vary.

It is an object of this invention to provide a system which avoids this drawback.

The arrangement according to the invention comprises two electroacoustic transducers which are placed in contact with the pipe wall at a certain distance from each other, on different, for example diametrally opposed, generatrices of the pipe, and means for measuring the difference of the times of propagation between the two transducers in one direction and in the other.

Figure 1:
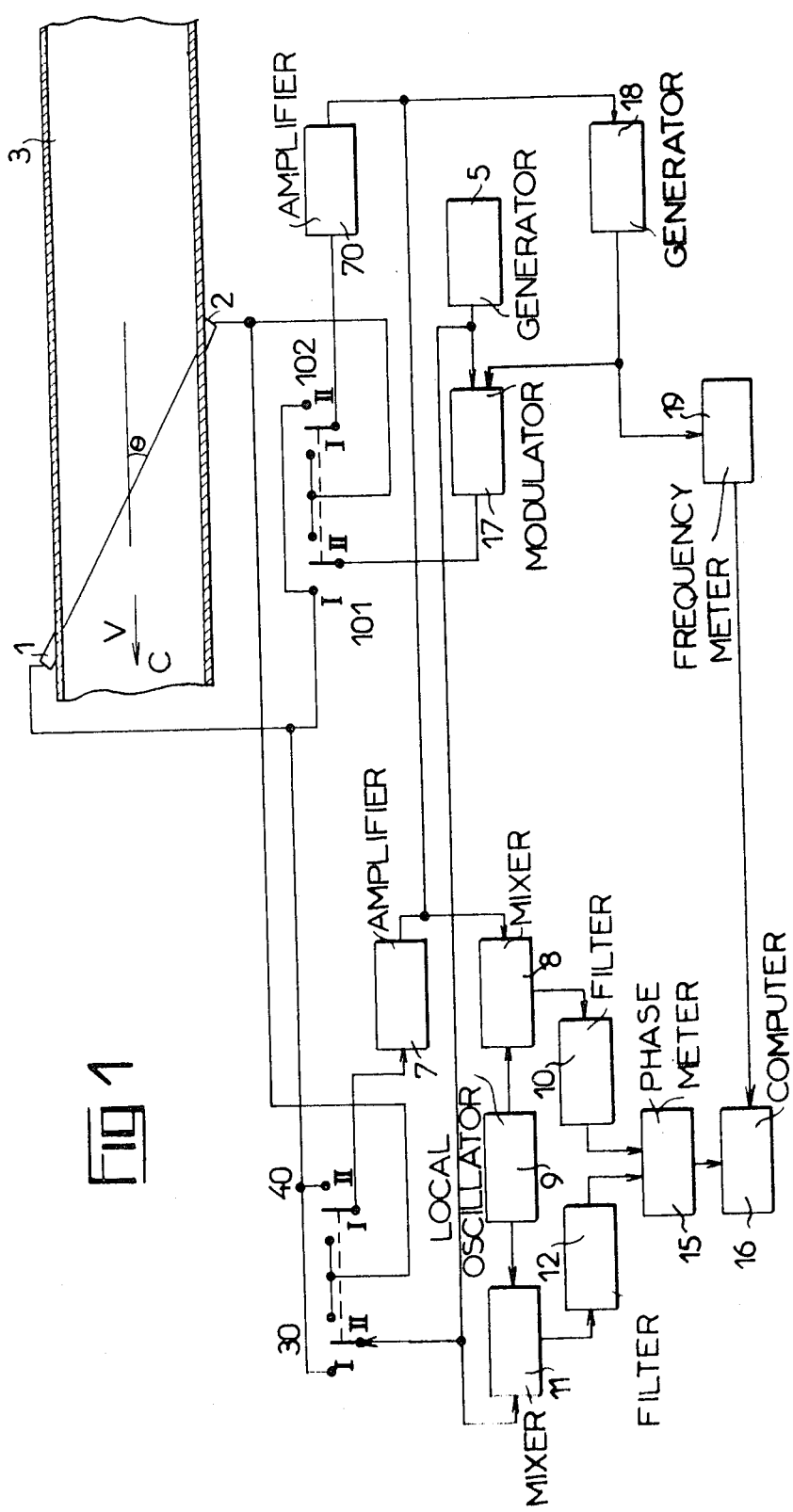
Figure 2:
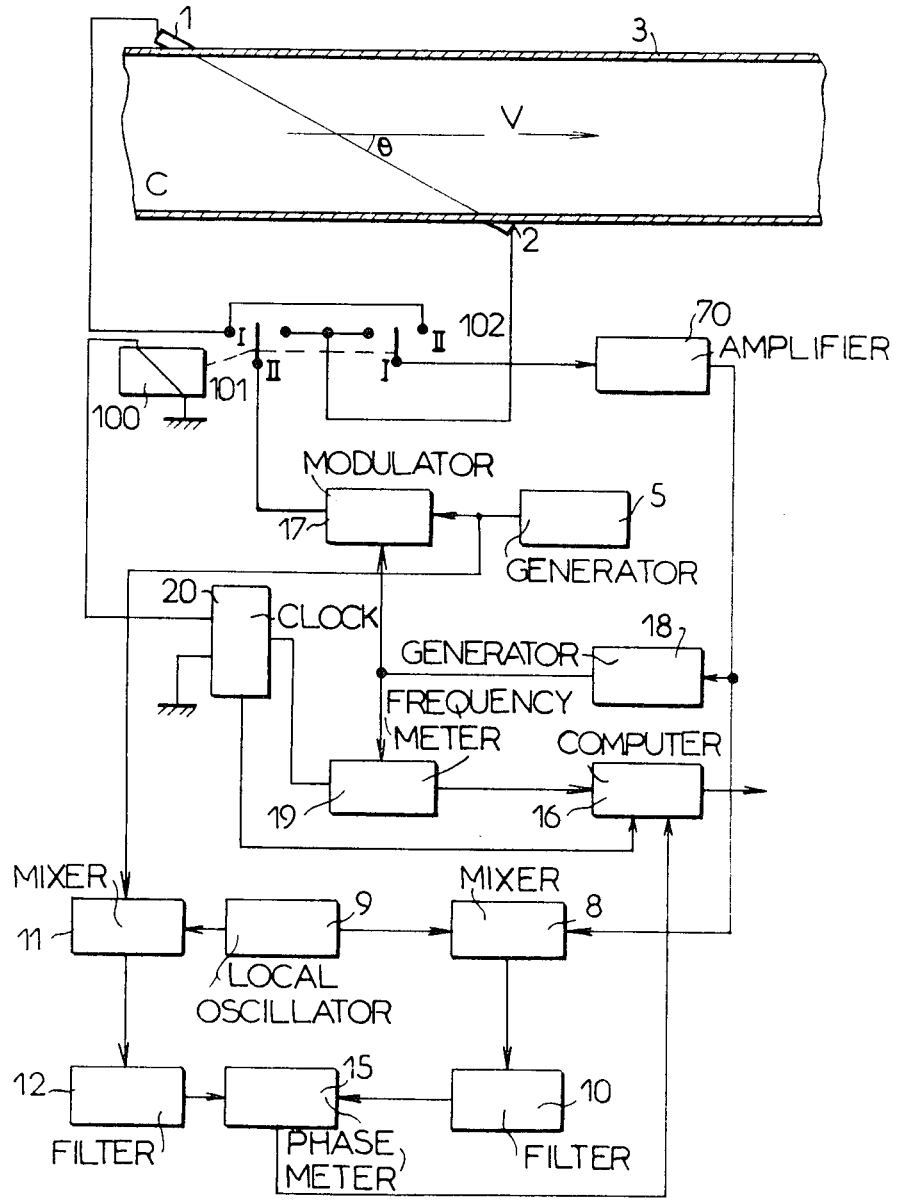

The invention will be better understood from the following description with reference to the appended drawing, in which:

FIG. 1 is a schematic diagram of a first arrangement according to the invention; and FIG. 2 represents a second arrangement according to the invention.

FIG. 1 shows two electroacoustic transducers 1 and 2 placed along a pipe 3 in which a fluid, whose rate of flow V is to be measured, flows in the direction of the arrow. Transducers 1 and 2 are placed on diametrically opposed generatrices. Transducer 1 is connected to pole I of double-throw switches 30 and 101 and to pole II of double-throw switches 40 and 102, while transducer 2 is connected to poles II and I of the same switches. Switches 30 and 40 are simultaneously in position I or in position II switches 101 and 102 are simultaneously in position I or in position II, but the actuating mechanism for switches 30, 40, 101 and 102 is so constructed as to provide a switching sequence comprising four steps.

In position I of switches 30 and 40 the arms of switches 101 and 102 are vertical, transducer 1 is connected to an HF generator 5 of frequency F, while transducer 2 is connected to an amplifier 7. A mixer 8 mixes the signals from amplifier 7 and from a local generator 9 of frequency F+f. Mixer 8 supplies a signal at frequency $f$ which is applied to a filter 10. The output signal of filter 10 is applied to a phasemeter 15. The phasemeter 15 also receives a signal from filter 12. This signal is obtained from a mixer 11, driven directly by generator 5 and also by local oscillator 9.

Switches 30 and 40 are in position I for a duration $t_1$, phasemeter 15 measures the the time T1 taken by a vibration of frequency F to travel from transducer 1, through the pipe and the liquid, to transducer 2. Transducer 1 is the transmitter and transducer 2 the receiver. The mixers preserve the phases.

Time T1 can be written:

$$T1 = \frac{l}{C+V \cos \theta}$$

where $\theta$ is the angle of the direction 1-2 with the axis of the pipe, V is the means fluid speed, $l$ the distance between the two transducers and C the velocity of propagation of sound in the liquid.

When the two switches 30 and 40 are simultaneously put in position II, for a second duration $t_2$, phasemeter 15 measure the time T2 taken by a vibration of frequency F to travel from transducer 2 to transducer 1. During this duration $t_2$ the arms of switches 101 and 102 remain vertical. The time T2 can be written, using the same notation:

$$T2 = \frac{l}{C-V \cos \theta}$$

A computer 16 records the time difference T2−T1, and switches 30 and 40 return to a rest position lying between positions I and II. The difference T2−T1 can be written:

$$T2 - T1 = \frac{2lV \cos \theta}{(C+V \cos \theta)(C-V \cos \theta)}$$

Knowing T2−T1, $l$, cos $\theta$ and C, it is possible to determine V. However, the propagation velocity C varies with many factors and substantial errors could arise through not knowing it accurately. The invention eliminates the effect of velocity C on the accuracy of the measurement by means of the circuit shown on the right side of FIG. 1.

On this side, the two transducers 1 and 2 are connected to switches 101 and 102, having two positions I and II.

In position I of switches 101 and 102 the arms of switches 30 and 40 are vertical, transducer 1 is connected for a duration $t_3$ to generator 5 through a modulator 17. This modulator is driven by a voltage generator 18. This generator 18 is of the monostable type, that is to say, it delivers a voltage pulse of specific duration when a triggering pulse is received by its input. In the absence of a pulse at the input of generator 18, modulator 17 cuts off the voltage at frequency F delivered by generator 5. Transducer 2 is connected for the same duration $t_3$ to the input of generator 18 through amplifier 70.

The arrangement operates as follows. From an initial pulse provided by the output of amplifier 7, generator 18 is triggered and a sine-wave train or wave packet is transmitted by transducer 1 and received by transducer 2 after a time T1. This received wave-train will trigger generator 18 for another cycle. Thus the arrangement will generate pulses at a frequency $$\frac{1}{T_1} = \frac{C+V \cos \theta}{l}$$

The initial pulse starting this process can be easily obtained when the power supply voltage is applied to amplifier 7.

In position II of switches 101 and 102, the arms of switches 30 and 40 remain vertical, the same action takes for a duration $t_4$ and at frequency $$\frac{1}{T_2} = \frac{C-V \cos \theta}{l}$$

A frequency-measuring device measures both frequencies $1/T_1$ and $1/T_2$. The arms of switches 101 and 102 return to a rest position for the next two durations $t_5$ and $t_6$ and so on. Computer 16 which has stored $T_1$, $T_2$, $1/T_1$ and $1/T_2$ during the sequence $t_1\ t_2\ t_3\ t_4$ is ready for making the product $$(T_2 - T_1) \frac{1}{T_1} \frac{1}{T_2} = \frac{2V \cos \theta}{l}$$

The latter formula does not contain the sound propagation velocity C. This velocity has thus been completely eliminated while measurement precision has into way been diminished.

Of course the invention is not limited to the embodiment shown in FIG. 1 which performs a measurement in four steps.

FIG. 2 shows another embodiment of the system according to the invention wherein the elements, 1, 2, 3, 5, 7 8, 9, 10, 11, 12, 15, 16 17, 18, 19, 101 and 102 are essentially the same as the corresponding elements of FIG. 1. FIG. 2 further shows a clock 20 which controls the actuating mechanism 100 of switches 101 and 102, the frequency meter 19 and the computer 16. The arrangement of FIG. 2 differs from the arrangement of FIG. 1 by the omission of switches 30 and 40 and by the absence of amplifier 7; the operation of the system of FIG. 2 comprises only two steps. When the arms of switches 101 and 102 are pushed in position I, wave packets are emitted by transducer 1 at a frequently $1/T_1$.

The carrier frequency of the emitted wave packet is equal to the frequency of the continuous wave supplied by generator 5. The wave packets are received by transducer 2 and since they include a delayed carrier wave, the latter can be fed to phasemeter 15 with the continuous wave supplied by generator 5 for measuring a phase shift proportional to the time delay $T_1$. Computer 16 stores the value of $T_1$ supplied by phase meter 15 and the value of $1/T_1$ given by frequency meter 19.

When the arms of switches 101 and 102 are switched in position II by clock 20, wave packets are emitted by transducer 2 at a frequency $1/T_2$ and computer 16 stores $T_2$ $1/T_2$ and computes the product $(T_1-T_2)$ $1/T_1 \cdot 1/T_2$ from which the value of V is derived. Of course the invention is not limited to the above-mentioned embodiments which were given solely by way of example.

What is claimed is:

1. A system for measuring the discharge speed of a fluid flowing in a pipe, comprising: a fist and a second electroacoustical transducer positioned at a certain distance from each other in the longitudinal direction of said pipe, on different generatrices thereof; means for propagating wave packets from said first towards said second transducer and form said second to said first transducer; said wave packet generating means having an input and an output; switching means for selectively connecting said input and output respectively to said first and second transducers and vice versa; frequency-measuring means coupled to said generating means for supplying signals inversely proportional to the respective propagation times of said wave packets between said transducers; phase-metering means coupled to said input and output for supplying a further signal proportional to the difference between said propagation times; and calculating means coupled to said frequency-measuring means and to said phase-metering means.

2. A system for measuring the discharge speed of a fluid flowing in a pipe, comprising: a first and second electroacoustical transducer positioned at a certain distance from each other in the longitudinal direction of said pipe, on different generatrices thereof; signal-generating means; phase-metering means having one input connected to said signal-generating means and a further input; switching means for alternately coupling said further input to said first transducer and said signal-generating means to said second transducer and vice versa; a modulator for pulse modulating the output signal of said signal-generating means, said modulator having an output; a monostable generator having an output driving said modulator and an input; switching means for selectively connecting said modulator output and said monostable generator input respectively to said first and second transducer and vice versa; and calculator means coupled to said modulator and to said phase-metering means.

* * * * *